UNITED STATES PATENT OFFICE.

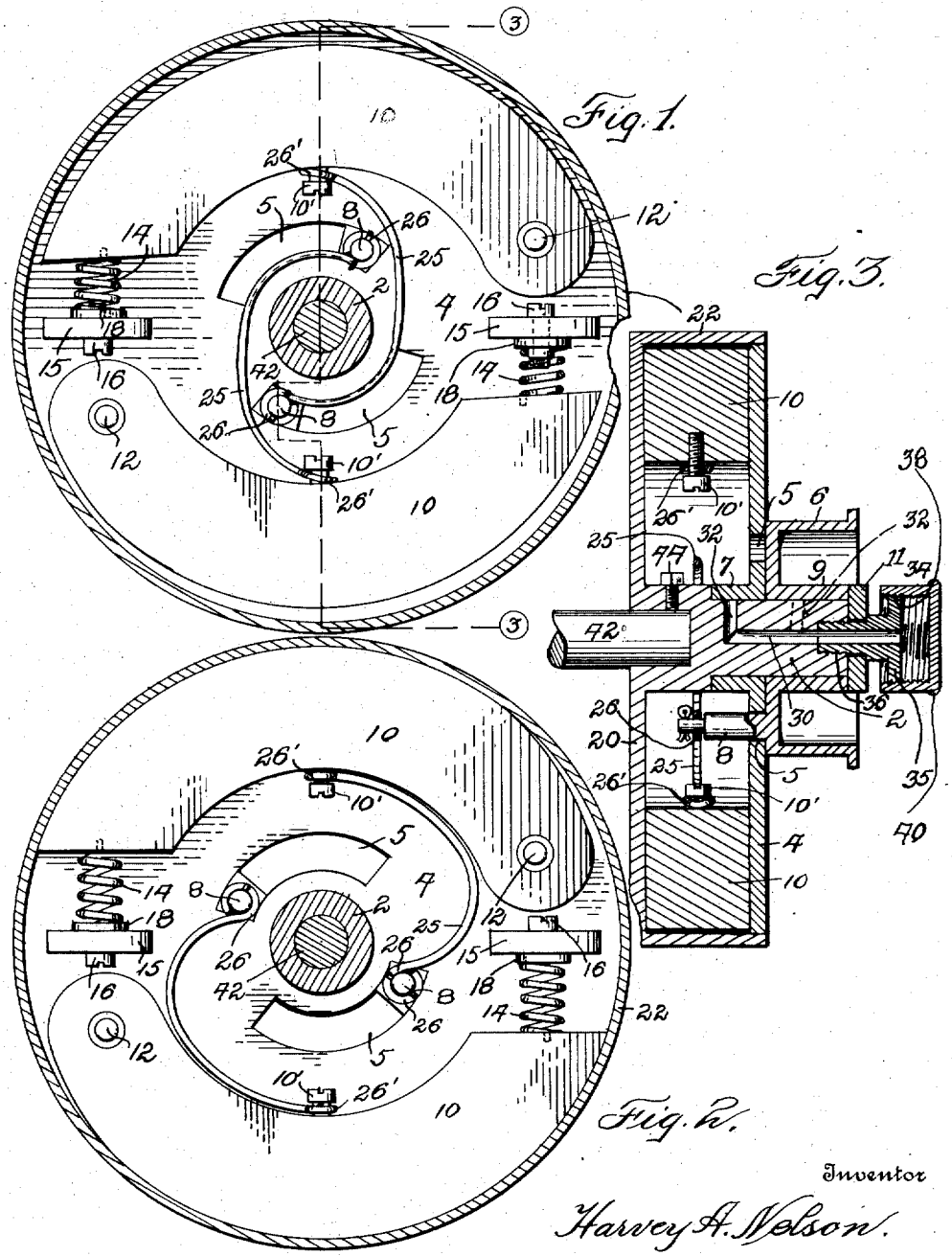

HARVEY A. NELSON, OF DUBUQUE, IOWA.

SPEED-REGULATING DEVICE.

1,196,015. Specification of Letters Patent. Patented Aug. 29, 1916.

Application filed November 30, 1915. Serial No. 64,238.

*To all whom it may concern:*

Be it known that I, HARVEY A. NELSON, a citizen of the United States, residing in the city and county of Dubuque and State of Iowa, have invented certain new and useful Improvements in Speed-Regulating Devices, of which the following is a specification.

My invention relates to pulleys, with special reference to such as are known in the art as governing pulleys, and one of the objects is to provide means to take up the jar of the explosion of explosive engines and make the machinery to which it is attached, run at a uniform rate of speed and evenly under all circumstances.

Another object is to provide means for starting and stopping the pulley slowly.

The following specification will fully describe the manner of construction and mode of operation, when the same is read in connection with the drawings accompanying the same and forming a part hereof.

The device is more particularly intended to be used in connection with cream and milk separators, though it may be used in numerous other relations. In the separation of cream from milk, the separator is geared to run at a very high rate of speed, and the power is usually derived from explosive engines. In order to make the best separation there must be an evenness of speed and ordinarily when the engine explodes the speed is accelerated and then lessened, but with my device I endeavor to keep the same speed whether the engine is exploding or otherwise.

Figure 1 is a plan view of the disk with the brakes released. Fig. 2 is a plan view of the disk with the brakes set in contact with the flange on the member, and the flange shown in section. Fig. 3 is a vertical section through the device.

Referring to the drawings, there is mounted on boss 2 a disk 4 having therethrough slots 5. The disk is provided with a hub 7, which forms a bearing for the disk on the boss 2. On the boss 2 is further mounted a belt-pulley 6, which is provided with two posts 8, which posts project through the slots 5. The pulley is also provided with a hub 9, which forms a bearing for the pulley on the boss 2. Against the outer end of the hub 9 is secured a washer 11 that holds the pulley on the boss.

To the surface of the disk 4 are pivoted clutch members 10, preferably wood, by pivot pins 12 and against the outer ends of the clutch members are secured springs 14. On the surface of the disk 4, opposite to the pins 12, are set two posts 15 having screwholes therethrough. The screw-holes are engaged by screws 16 and by operating the screws the tension of the springs may be readily adjusted. At the outer ends of the screws are threaded plates 18 to which the springs are fastened.

Integral with or attached to the boss 2 is a member 20 provided with a flange 22 which is substantially of the same diameter as the disk 4. Against the opposite sides of the clutch members 10 on the inner sides are fastened wires or rods 25, which are provided at their outer ends, with rings 26 adapted to engage the posts 8 set on the belt pulley 6.

For the purpose of more conveniently lubricating the parts of the device there is formed in the boss 2 a recess 30 adapted to hold hard oil, also openings 32 leading from the recess 30 to the inner side of the hub 9 and to the flange 7. The boss is screwthreaded in the recess 30 at its outer end and in it is screwed a hollow grease-cup 34. The cup is formed by a hollow member 35 that carries a screw 36 adapted to engage the recess 30 and hold the cup in position. The upper portion of the member is screw threaded at 38 and upon this is screwed the cap 40. The whole pulley thus formed is fixed on a boss 42 and held in position by a set screw 44.

The manner of operating my device is substantially as follows: Starting with clutch members out of engagement with the flange 22 as shown in Fig. 1 power is applied to the pulley and as that is rotated the posts 8 are brought along in the slots 5 till they come to the outer ends and then start in motion the disk 4 and at the same time the rods 25, in connection with the springs 14, force the clutch members against the flange 22. When the clutch members come in contact with the flange, the member being integral with the flange, will be caused to rotate, at first slowly and constantly increase till the clutch members are rigidly against the the flange and the speed at its full. If at any time the springs are not of sufficient tension to hold the clutch members, then the screws 16 by engagement with the plates 18 may be adjusted to meet the tension required. When the power is shut off the posts will be brought back to the other end of the slots and the springs compressed and this will draw the clutch members from contact with the flange and the member 20 will gradually come to rest.

When it is desired to lubricate the parts, the operator simply screws down the cap and this forces the hard oil against the parts through the openings 32.

It will be seen by this mode of construction, that the member carrying the flange 22 will be both started and stopped gradually and as the clutch members are not rigidly fixed in engagement with the flange there will be sufficient give to prevent any jerk or extra movement of the member and thus the member will travel at a uniform rate of speed unaffected by the explosive jar of the engine.

Having now described my invention, what I claim is—

1. In a device of the character described, a boss, a pulley mounted on the boss, a disk mounted on the boss, clutch members pivoted to the disk, a member provided with a flange, and means engaging the pulley and member for bringing the clutch members into and out of engagement with the flange on the member.

2. In a device of the character described, a boss, a disk mounted on the boss, clutch members pivoted to the disk, a member integral with the boss, a pulley mounted on the boss, and means connected to the disk and pulley for bringing the clutch members into and out of engagement with the member.

3. In a device of the character described, a boss, a pulley mounted on the boss, a disk journaled on the boss, clutch members pivoted to the disk, a member, and springs secured to the disk and clutch members for bringing the clutch members into engagement with the member.

4. In a device of the character described, a boss, a disk mounted on the boss and provided with slots, clutch members pivoted to the disk, a pulley provided with posts adapted to engage the slots in the disk, means for connecting the posts with the clutch members, a member, and means engaging the disk and the posts for bringing the clutch members into and out of engagement with the member.

5. In a device of the character described, a boss, a disk mounted on the boss and provided with slots, clutch members pivoted on the disk, a pulley mounted on the boss and provided with posts adapted to engage the slots in the disk, rods connected to the posts and clutch members, a member provided with a flange, and springs acting in conjunction with the rods for bringing the clutch members into and out of engagement with the flange on the member.

6. In a device of the character described, a hollow boss, a disk mounted on the boss, clutch members pivoted to the disk, a pulley mounted on the boss, a member integral with the boss, means connecting the pulley, the disk and the clutch members for bringing the clutch members into and out of engagement with the member, and means within and connected with the boss for lubricating the device.

7. In a device of the character described, a hollow boss, a member integral with the boss and provided with a flange, a disk mounted on the boss, clutch members pivoted to the surface of the disk, a pulley mounted on the boss, springs secured to the clutch members and disk, means for adjusting the tension of the springs, and means for oiling the parts.

In testimony whereof I affix my signature in presence of two witnesses.

HARVEY A. NELSON.

Witnesses:
M. M. CADY,
D. A. DODDS.

Copies of this patent may be obtained for five cents each, by addressing the "Commissioner of Patents, Washington, D. C."